(No Model.)
D. RYLANDS.
COUPLING GLASS LINED PIPES AND FITTINGS.
No. 438,023. Patented Oct. 7, 1890.
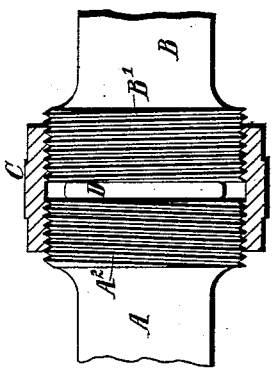
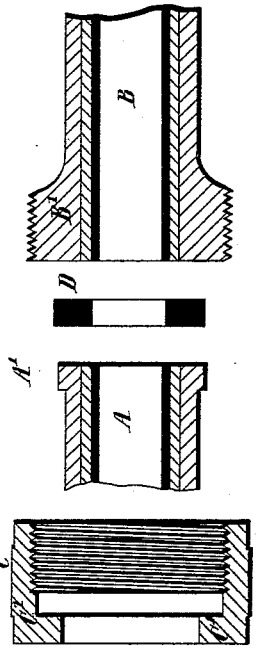
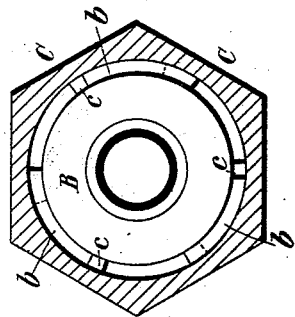
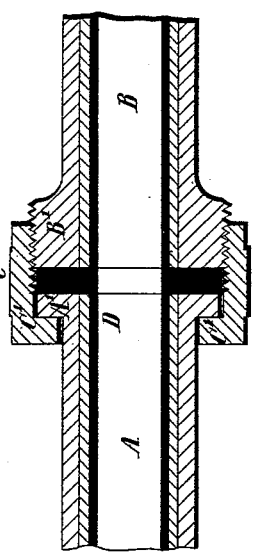
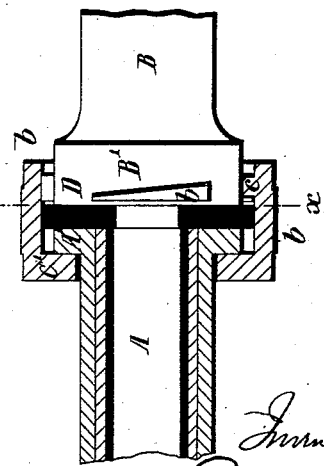
Witnesses:
J. A. Rutherford.
Ernest Everett.
Inventor:
Dan Rylands.
James L. Norris, Attorney.
THE NORRIS PETERS CO., PHOTO-LITHO., WASHINGTON, D. C.

UNITED STATES PATENT OFFICE.

DAN RYLANDS, OF BARNSLEY, ENGLAND.

COUPLING GLASS-LINED PIPES AND FITTINGS.

SPECIFICATION forming part of Letters Patent No. 438,023, dated October 7, 1890.

Application filed February 5, 1890. Serial No. 339,270. (No model.)

*To all whom it may concern:*

Be it known that I, DAN RYLANDS, glass-manufacturer, a subject of the Queen of Great Britain, and a resident of Barnsley, England, have invented certain new and useful Improved Means of Coupling Glass-Lined Pipes and Fittings, of which the following is a specification, reference being had to the accompanying drawings.

My invention relates to the coupling or connecting of glass-lined pipes and fittings. In pipes and fittings of this character—that is to say, pipes and fittings lined with glass—it is very important that there should be no twisting or turning of the pipes or fittings themselves while being coupled, otherwise the rubbing action that occurs between the pipes and the jointing-ring tends to abrade the ends of the glass linings and to buckle the said rings. Under these circumstances the ends of the glass linings become so worn or damaged that a good joint—that is to say, a joint which will prevent the liquids or gases which pass through the pipe from coming into contact with anything but the glass lining and jointing-ring—cannot be made.

According to my invention I provide coupling glass-lined pipes and fittings in such a manner as to avoid the said rubbing and abrading action and to insure that the jointing-ring shall be subjected only to a direct compressing force.

I form on one end of the glass-lined pipe, by welding or otherwise, an external collar or flange, and on the end of the pipe or fitting to be coupled therewith I form a screw-threaded enlargement or boss. Before forming the said collar or flange I place on the pipe a coupling-nut provided at its inner end with an internal shoulder or flange. The dimensions of the said nut are such that its internal shoulder will freely slide on the pipe, but will not pass over the collar at the end thereof, while on the other hand the screwed portion of the nut will freely slide over the said collar. The coupling-nut is constructed to screw on the aforesaid threaded end of the companion pipe or fitting, and the joint is made as follows—that is to say, the collared end of the pipe, with its loose lantern-nut thereon, and the screw-threaded end of the companion pipe or fitting are brought together, a jointing-ring of any suitable kind having first been placed between the two ends, and the coupling-nut is then screwed home on the end of the said screw-threaded pipe or fitting. Inasmuch as the collar and flange or shoulder on the pipe and nut, respectively, prevent the nut being drawn off the pipe the result of the above operation is that the pipes or pipe and fitting are forcibly drawn together by a straight pull, the jointing-ring is tightly compressed, and a good joint is made, while all abrading action on the glass linings is avoided. The sections of piping in any service may be so constructed that each pipe has a screwed boss at one end and a plain collar at the other end provided with a loosely-fitting coupling-nut, as above described, or the alternate lengths of piping may be screw-threaded at both ends and the intermediate lengths flanged at both ends and provided with two coupling-nuts. In the case of glass-lined fittings, whether T's, elbows, bends, or other fittings, I prefer that the ends should be screw-threaded and the coupling-nuts mounted on the pipe-sections to be connected thereto.

According to another modification of my invention, instead of providing the coupling-nut and the screw-threaded boss, with which it engages, with ordinary continuous screw-threads I form on the said boss two or more inclined planes, each extending through a fraction only of the circumference of the said boss and forming portions of rapid-pitch screw-threads, and I form in the nut corresponding internal inclined planes or (which answer the same purpose) projecting pieces or lugs. A slight twist of the coupling-nut is in this case sufficient to tighten the joint.

In a further modification I provide the two companion ends of the pipes or fittings to be coupled together with ~~screw-threaded bosses~~ the one having a right-hand thread and the other a left-hand thread, and I couple the ends of the pipes or fittings together by a nut or ring screw-threaded at the ends with right and left hand threads to correspond with those of the pipes or fittings. By the rotation of this nut in one direction the pipes or fittings are forcibly drawn together and a joint made without any turning or twisting of the pipes themselves.

In the accompanying drawings I have shown how my said invention may be conveniently and advantageously carried into practice.

Figure 1 is a longitudinal central section of my improved coupling for glass-lined pipes and fittings. Fig. 2 shows in longitudinal central section several parts of the said coupling detached. Fig. 3 is a sectional elevation of a coupling constructed according to one modification of my invention. Fig. 4 is a transverse section on the line $x\,x$, Fig. 3. Fig. 5 is a sectional elevation of a coupling constructed according to a further modification of my invention, and Fig. 6 is a longitudinal central section of the coupling-ring shown in Fig. 5.

Like letters indicate corresponding parts throughout the drawings.

Referring to Figs. 1 and 2, A is the end portion of a glass-lined pipe, provided with a collar or flange A'.

B is the end portion of a glass-lined pipe or fitting, provided with a screw-threaded enlargement or boss B' to be coupled to the pipe A.

C is a coupling-nut mounted on the pipe A and having an internal flange C'. The screw-threaded portion of the nut is sufficiently large to pass freely over the collar A'. The flange C' is so constructed that it will fit easily on the body of the pipe, but will not pass over the said collar. The screw-threaded boss B' is constructed to fit the screw-threaded part of the coupling-nut C. To couple the pipes or pipe and fitting A B, all that is required is to bring the two companion ends together, with a vitreous ring D between them, and to screw the coupling-nut C on the boss B', when the internal flange C' will bear on the collar A' and draw the parts A' B' forcibly together. The only piece that turns in this operation is the coupling-nut, so that there is no rubbing or abrading of the ends of the glass linings.

In the modification shown in Figs. 3 and 4 the boss B' is constructed with two or more projecting inclined planes $b$ (each extending through a fraction only of the circumference of the boss) in lieu of being screw-threaded, as shown in Figs. 1 and 2. The coupling-nut is constructed with corresponding inclined planes $c$, or with simple internal lugs or projections adapted to slide over the planes $b$. The said inclined planes $b$ form portions of screw-threads of very rapid pitch, and the action when screwing on the coupling-nut is precisely that of an ordinary screw-threaded nut, with this advantage, that a slight turn of the nut is sufficient to make the joint.

In the further modification shown in Figs. 5 and 6 both ends of the pipes or fittings A and B have screw-threaded bosses A² B'. One of the screw-threads, however, is left-handed and the other right-handed, and the coupling-nut C, which in this case is a plain ring or nut without internal flange, is screw-threaded at the ends with right and left hand threads to correspond, as shown in Fig. 6. Therefore the rotation of the nut will draw both ends equally and force them together on the vitreous ring D.

In the case of fittings of any kind, and where the plan of coupling adopted is either of those shown in Figs. 1 to 4, I prefer that the coupling-nut should be mounted on the pipe and not on the fitting.

What I claim is—

1. The combination, with two pipes coupled together and provided with a vitreous lining, of a vitreous ring interposed between the two pipe ends and flush with the vitreous pipe-linings to produce a continuous vitreous lining at the pipe-joint, substantially as described.

2. The combination, with two pipes having a vitreous lining, of a vitreous ring interposed between the pipe ends and flush with the vitreous pipe-linings, and a rotating screw-coupling nut connecting the pipes and inclosing the vitreous ring, substantially as described.

In testimony whereof I have hereunto signed my name in the presence of two subscribing witnesses.

DAN RYLANDS.

Witnesses:
GEORGE HARRISON,
THOMAS JOHNSON.